UNITED STATES PATENT OFFICE.

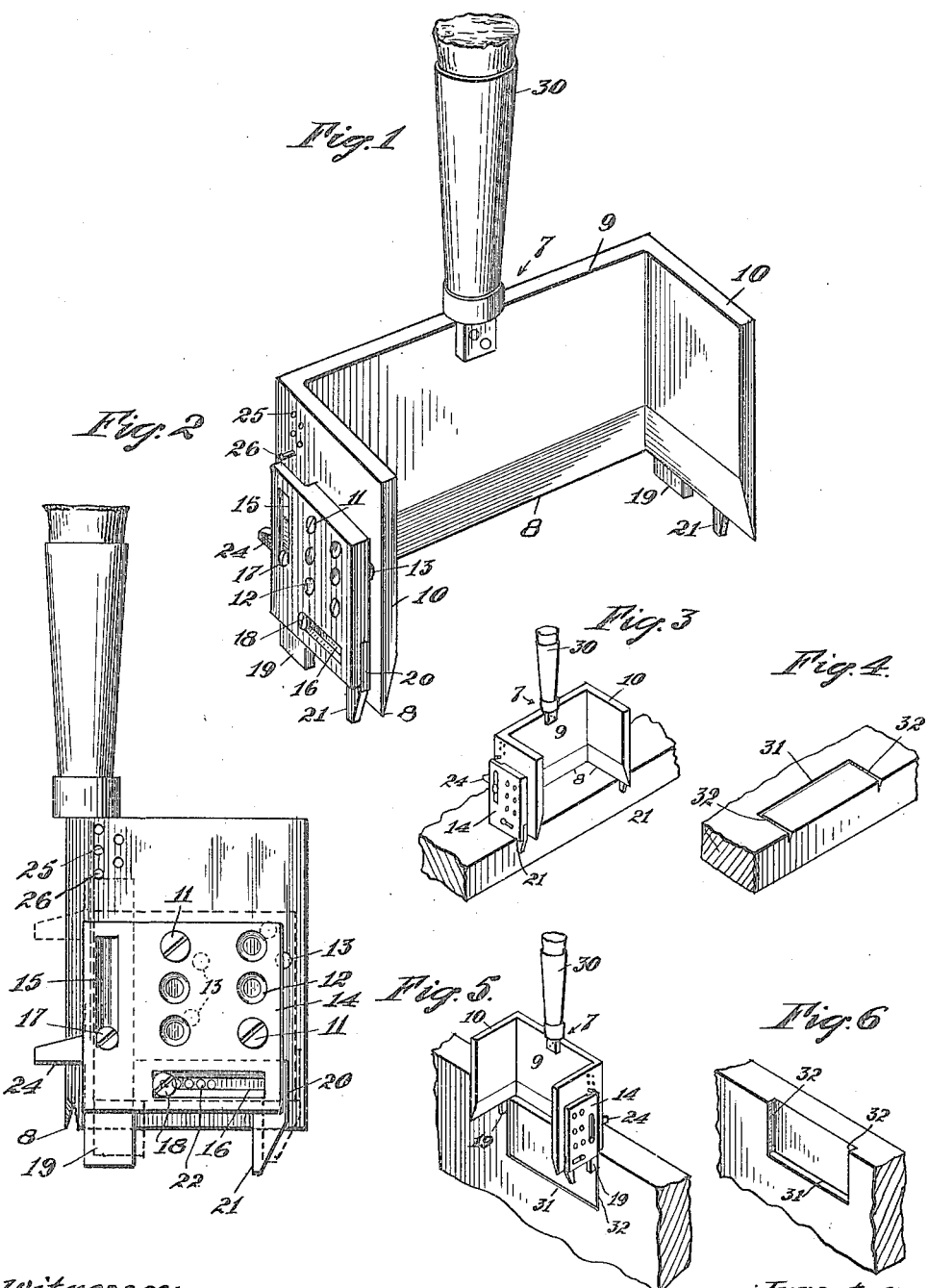

TENNYSON I. GIBSON, OF LOS ANGELES, CALIFORNIA.

RECESS-CUTTING TOOL.

1,135,890.  Specification of Letters Patent.  Patented Apr. 13, 1915.

Application filed October 20, 1913. Serial No. 796,199.

*To all whom it may concern:*

Be it known that I, TENNYSON I. GIBSON, a citizen of the United States, residing at Los Angeles, in the county of Los Angeles, State of California, have invented new and useful Improvements in Recess-Cutting Tools, of which the following is a specification.

This invention relates to recess cutting tools and the principal object is to provide a recess cutting tool adapted to cut the walls and floor of a recess with one tool.

It is also an object to provide a recess cutting tool with means to adjust the depth of cut in both planes.

It is a further object to provide a recess cutting tool of U-shaped form in which some of the parts are slidably mounted to be forced out of position for one operation and to be used in a reverse plane to complete the recess.

In the drawings accompanying this specification: Figure 1 is a perspective view of the improved recess cutter or chisel. Fig. 2 is a side elevation of the same, the cutting edge being broken away at the lower inner corner. Fig. 3 is an illustration showing the tool in position to cut the walls as shown in Fig. 2. Fig. 4 is a perspective view showing the walls cut out or impressed adjacent the corner upon which it is desired to insert the butt of a hinge. Fig. 5 shows the tool reversed in a plane at right angles to Fig. 3 to shave out the material between the end walls as shown in Fig. 4 to form the recess shown in Fig. 6. Fig. 6 is a perspective view of the finished recess.

Heretofore in forming seats for hinges or recesses for locks a large number of independent movements of the chisel requiring skilled labor are necessary to cut the recesses. This invention overcomes the above objections and provides a chisel or recess cutter which only requires two operations, and the operations can be readily performed by a cheaper class of labor after the tool has once been set.

More specifically in the drawings 7 represents the tool in which the chisel thereof having the edge 8 is of the U-shaped or channeled form, the cutting edge being on the exterior surfaces of the front wall 9 and the side walls 10 forming the chisel structure, the side walls being provided with a plurality of sliding gages, more particularly described hereafter.

To accommodate the gages a plurality of threaded openings 13 are provided, these openings being arranged to receive the screws 11 which are carried through bores 12 formed in the body of the gage plate 14. Six openings 12 are shown which are preferably disposed in two parallel rows so that two different screws will hold the gage in fixed relation to the side walls of the chisel, this plate being provided with two slots 15 and 16 which are disposed at right angles to one another and the slots forming the bearings for the screws 17 and 18 respectively which are threaded into the slidable portions of the gages 19 and 20. Taking these sliding portions in sequence of their operation, the gage 20 slides in a recess formed in the back of the plate and in contact with the outer face of the chisel wall, the movement being fixed by means of its screw 18 so that the width of the recess to be cut is determined by the distance of the forward edge 21 of the finger on the gage 20 to the cutting edge 8 on the front wall of the tool. Adjustments of this finger may be made by means of openings 22 in the body and registering with the slot 16 so that the position of the screw 18 may be shifted in relation thereto as well as to the body of the plate. The gage member 19 is adapted to slide in a recess formed on the inner wall of the gage plate, one side contacting with the wall of the channeled body, its path of movement being parallel with the outer face of the front wall of the chisel, and it has a gage edge 24 which corresponds and regulates the distance equal to that of the gage edge 21 from the chisel edge 8. To limit this movement a plurality of openings 25 are provided in the end wall adapted to receive a pin 26 which forms a stop for the sliding movement of the gage 19 secured in its slidable relation by means of its screw 17 sliding freely in the slot 15.

The operation of the tool will be readily understood from the description and drawings. In the initial operation the tool is placed in the position as shown in Fig. 3 with the gage edge 21 engaging the edge of the material and the lower end of gage 19 will be lifted up out of normal position, there being sufficient room for this action and with one stroke of the mallet upon the handle 30 usually provided with the tool, the cutting edges 8 are forced into the wood to provide the inner wall 31 and the side walls 32 of the recess. The material is now turned into a position at right angles thereto, or the tool carried to a position in a plane at right angles thereto with the gages 19 extended as shown in Figs. 1 and 5 with the side walls registering in line with the cuts 32, and one, or a number of strokes upon the handle head carries the chisel downwardly until the gage edge 24 engages with the edge of the material at the corner of the recess.

By shifting the gage plate in the position shown to engage with a series of the other openings 10 the plate is carried from the position shown to cut the smallest depth of cut of the recess to a greater depth of cut by shifting the plate at an angle of forty-five degrees, since, it will be seen that the openings are in line with a plane of forty-five degrees or midway between the two cutting edges of the side and front walls so that shifting the plate and securing it by means of the screws 11 in the different series of openings, successive variations in the depth of cut are readily obtained.

What I claim is:

1. In a recess cutting tool, the combination with a U-shaped body member, of a pair of plates mounted on the outer faces of the side portions of the body member, vertically slidable members carried by said plates with their lower ends normally projecting below the cutting edges of the side members having projecting portions extending beyond the rear vertical edge of the side members, means for limiting the downward movement of the slidable members, and adjustable means for limiting the upward movement of the slidable members.

2. In a recess cutting tool, the combination with a U-shaped body member, of a pair of plates mounted on the outer faces of the side portions of the body member, vertically slidable members carried by said plates with their lower ends normally projecting below the cutting edges of the side members having projecting portions extending beyond the rear vertical edge of the side members, means for limiting the downward movement of the slidable members, adjustable means for limiting the upward movement of the slidable members, and means for permitting adjustment of the plates diagonally on the side members and securing them against movement in relation thereto.

3. In a recess cutting tool, having a front wall and side walls on the ends thereof disposed at right angles thereto, a pair of diagonally adjustable plates mounted on the exterior faces of the side walls, gage members reciprocally mounted on said plate normally gravitated to their lowermost position with their lower ends projecting below the lower edges of the side walls, means for limiting the downward movement of said members, and adjustable means for limiting the upward movement of said members, and projections on said members adapted to be engaged by the body being channeled during the cutting operation to shift the gage members in relation to the plates and end walls.

4. In a recess cutting tool having a front wall and side walls projecting therefrom at right angles thereto, a pair of plates mounted for diagonal adjustment on the outer faces of the side walls having vertically extending channels on their inner faces and slots opening to said channels, gage members slidably mounted in said channels, screws passing through said slots and engaging said gage members to limit the downward movement of the latter so that their lower ends will normally extend below the lower edges of the side walls, projections on said gage members extending beyond the outer face of the front wall adapted to be engaged by the edge of the material being recessed on the advance movement of the front wall thereinto to cause a movement of the gage members in relation to the tool as the latter is advanced, and adjustable means for limiting the movement of the gage members to regulate the depth of the cut made by the tool.

5. In a recess cutting tool having a front wall and side walls projecting therefrom at right angles thereto, a pair of plates mounted for diagonal adjustment on the outer faces of the side walls having vertically extending channels on their inner faces and slots opening to said channels, gage members slidably mounted in said channels, screws passing through said slots and engaging said gage members to limit the downward movement of the latter so that their lower ends will normally extend below the lower edges of the side walls, projections on said gage members extending beyond the outer face of the front wall adapted to be engaged by the edge of the material being recessed on the advance movement of the front wall thereinto to cause a movement of the gage members in relation to the tool as the latter is advanced, and adjustable means for limiting the movement of the gage member to regulate the depth of the cut made by the tool, said means comprising pins adapted to be inserted in any one of a number of opening in the side walls.

In witness that I claim the foregoing I have hereunto subscribed my name this 14th day of October, 1913.

TENNYSON I. GIBSON.

Witnesses:
  MERLE HAMMOND,
  MARIE BATTEY.